United States Patent [19]
Chittofrati et al.

[11] Patent Number: 6,013,712
[45] Date of Patent: Jan. 11, 2000

[54] PERFLUOROPOLYMER DISPERSIONS

[75] Inventors: Alba Chittofrati, Milan; Paolo Lazzari, Cagliari; Daria Lenti, Alessandria, all of Italy

[73] Assignee: Ausimont S.p.A., Milano, Italy

[21] Appl. No.: 09/124,966

[22] Filed: Jul. 30, 1998

[30] Foreign Application Priority Data

Jul. 31, 1997 [IT] Italy ................ MI97A1833

[51] Int. Cl.$^7$ .................................. C08K 5/06
[52] U.S. Cl. .............................. 524/366; 524/462
[58] Field of Search .................... 524/545, 366, 524/462

[56] References Cited

U.S. PATENT DOCUMENTS

| | | |
|---|---|---|
| 2,242,218 | 5/1941 | Auer . |
| 3,665,041 | 5/1972 | Sianesi et al. . |
| 3,715,378 | 2/1973 | Sianesi et al. . |
| 4,284,518 | 8/1981 | Reick ............... 252/16 |
| 4,338,237 | 7/1982 | Sulzbach ............ 524/777 |
| 4,472,290 | 9/1984 | Caporiccio ........... 252/51.5 |
| 4,523,039 | 6/1985 | Lagow et al. . |
| 4,675,380 | 6/1987 | Buckmaster et al. . |
| 4,789,717 | 12/1988 | Giannetti et al. . |
| 4,864,006 | 9/1989 | Giannetti et al. . |
| 4,906,770 | 3/1990 | Marchionni et al. . |
| 4,985,282 | 1/1991 | Moggi ............... 427/393 |
| 5,051,158 | 9/1991 | Marchionni et al. . |
| 5,077,097 | 12/1991 | Moggi ............... 427/393.6 |
| 5,294,248 | 3/1994 | Chittofrati et al. . |
| 5,532,310 | 7/1996 | Grenfell et al. . |

FOREIGN PATENT DOCUMENTS

| | | |
|---|---|---|
| 0075312 | 3/1983 | European Pat. Off. . |
| 0 148 482 | 7/1985 | European Pat. Off. . |
| 0 247 379 | 12/1987 | European Pat. Off. . |
| 0 556 770 | 8/1993 | European Pat. Off. . |
| 0 566 770 A1 | 8/1993 | European Pat. Off. . |
| 0 633 274 | 1/1995 | European Pat. Off. . |
| 0 687 533 | 12/1995 | European Pat. Off. . |
| 0695 775 | 2/1996 | European Pat. Off. . |
| 0 709 517 | 5/1996 | European Pat. Off. . |
| MI96A0442 | 3/1996 | Italy . |
| MI96A1411 | 7/1996 | Italy . |
| MI96A1412 | 7/1996 | Italy . |
| M96A001785 | 8/1996 | Italy . |
| 1104482 | 2/1968 | United Kingdom . |
| 1226566 | 3/1971 | United Kingdom . |

*Primary Examiner*—Paul R. Michl
*Attorney, Agent, or Firm*—Nikaido Marmelstein Murray & Oram LLP

[57] ABSTRACT

Dispersions comprising at least:

0.1–30% by weight of a polytetrafluoroethylene or tetrafluoroethylene copolymers with other ethylenically unsaturated monomers;

50–99% by weight of fluorinated liquid;

polar solvent (water and/or alcohol) complement to 100;

0.01–5% by weight of surfactant selected from:
(a) nonionic hydrogenated or
(b) fluorinated, having a perfluoropolyether or perfluoroalkylic chain, both of ionic and non ionic type, selected from the following classes:
A') mono and dicarboxylic acid salts;
B') sulphonic acid salts;
C') phosphoric mono and diesters and their mixtures, as such or salified, optionally containing amounts of triesters lower than 15% by moles;
D') nonionic surfactants formed by fluorinated and polyoxyalkylenic chains with a number of oxyalkylenic repeating units higher than 6;
E') cationic surfactants having one or more fluorinated hydrophobic chains.

14 Claims, No Drawings

PERFLUOROPOLYMER DISPERSIONS

The present invention relates to dispersions based on fluorinated oils and (per)fluorinated polymers, in particular tetrafluoroethylenepolymers (polytetrafluoroethylene PTFE) or tetrafluoroethylene copolymers with other ethylenically unsaturated, totally or partially fluorinated, monomers.

Such dispersions, characterized in that they have an improved stability to segregation during the time, are prepared by mixing fluoropolymeric particulate in polar solvent (water and/or alcohol) with fluorinated liquid (oil) (perfluoropolyethers PFPE or perfluorocarbons) in the presence of specific surfactants.

It is known that homogeneous dispersions of fluorinated polymers in fluorinated "non-ozone depleting" liquids can be prepared according to U.S. Pat. No. 5,532,310.

This patent indicates the use of these dispersions for obtaining fluoropolymeric coatings, underlining the need to reduce to a minimum the content of not much volatile polar solvents both for their negative effect on the coating uniformity and to minimize the corrosion and/or flammability problems. The dispersions according to this patent are formed by a fluoropolymer, a perfluorinated liquid, a polar solvent and a fluorinated selected from: perfluoroaliphatic amidoalkanoles, PFPE chain acids and polymeric fluorinated surfactants obtained by polymerizing a fluorinated acrylic monomer with an hydrophilic monomer, (for instance acrylic acid, N-vinylpirrolidone, methacrylic acid). The surfactant concentration ranges between 0.01 and 5% by weight, it must be preferably as lowest as possible to avoid to leave residues on the treated surfaces. The surfactants are used to disperse 0.1–30% of polymer referred to the final homogeneous composition weight. The dispersion stability, according to the patent is of at least 5–10 seconds, but only in few cases of those exemplified, the polymer separation occurs after 10 minutes from the moment of their preparation. The dispersions remain homogeneous under stirring. According to this patent the stability in static conditions is only a relative measure of the dispersion quality and, on the contrary, it is not a limiting criterium for the use. Also the unstable dispersions are indicated as useful in said patent.

However tests carried out by the Applicant have shown that the dispersion stability is an important parameter. It is true that the dispersion, if the polymer sediments, must be redispersible by stirring, otherwise it would be unusable. It is necessary, however, to keep in mind that if a dispersion sediments in very short times, seconds or some minutes, it is difficult to be handled and to be applied since the system must be continuously stirred during the transport and the application. Besides the application difficulties, whose entity and criticality vary with the deposition method, the coatings obtained from unstable dispersions show problems of unhomogeneity and defects in correspondence with coagula.

In addition to the coating applications, the dispersions formed by a fluorinated polymer, a suitable viscosity fluorinated liquid, a polar solvent and a surfactant, can be used as additives for detergent compositions and polishes able to give to the treated surfaces high dirt-resistance. See for isntance U.S. Pat. No. 5,294,248. Since the polishes must have a high shelf life, it results that for this kind of application it is preferable to prepare the dispersions so as to have a fluoropolymer higher dispersion degree and consequently a greater stability of the system.

The need was felt to have available homogeneous dispersions having improved stability of fluorinated polymer in fluorinated oils.

An object of the prent invention is a dispersion, comprising at least:

0.1–30% by weight of a polytetrafluoroethylene or tetrafluoroethylene copolymers with other ethylenically unsaturated, totally or partially fluorinated, monomers;
50–99% by weight of fluorinated liquid;
polar solvent (water and/or alcohol) complement to 100;
0.01–5% by weight of surfactant selected from:
(a) nonionic hydrogenated or
(b) fluorinated, having a perfluoropolyether or perfluoroalkylic chain, both of ionic and nonionic type, selected from the following classes:

A') mono and dicarboxylic acid salts;

B') sulphonic acid salts;

C') phosphoric mono and diesters and their mixtures, as such or salified, optionally containing amounts of triesters lower than 15% by moles;

D') nonionic surfactants formed by fluorinated and polyoxyalkylenic chains with a number of oxyalkylenic repeating units higher than 6;

E') cationic surfactants having one or more fluorinated hydrophobic chains.

It is also possible to use mixtures of the above surfactants among each other or with the following surfactants: carboxylic acids with PFPE mono and/or perfluoroalkylic chain having the structure of class A'), and/or nonionic surfactants having a structure similar to D') but with a number of oxyalkylenic repeating units lower than or equal to 6.

Among the surfactants C'), described for intance in the EP 687,533 and EP 709,517, the perfluoropolyethers phosphoric monoesters and diesters can be mentioned, herein incorporated by reference.

The surfactants D') are described for instance in the EP 818,490, EP 818,849 and EP 826,714, herein incorporated by reference.

Among the surfactants E'), described for instance in the U.S. Pat. No. 5,294,248, herein incorporated by reference, the tetralkylammonium or pyridinium salts having PFPE chain can be mentioned.

As tetrafluoroethylene copolymers, the following ones for instance can be mentioned:

A) modified polytetrafluoroethylene containing small amounts, generally in the range 0.01–3% by moles, preferably 0.05%–0.5% by moles, of one or more comonomers selected from perfluroalkylperfluorovinylethers, such as for instance methylvinylether and propylvinylether; vinylidene fluoride; hexafluoroisobutene; chlorotrifluoroethylene; perfluoroalkylethylenes, such as for instance perfluoropropene;

B) tetrafluoroethylene (TFE) thermoplastic copolymers containing from 0.5 to 8% by moles of at least a perfluoroalkylvinylether, where the perfluoroalkylic radical has from 1 to 6 carbon atoms, such as for instance, TFE/perfluoropropylvinylether, TFE/perfluoromethylvinylether, TFE/perfluoroethylvinylether,TFE/perfluoroalkylethylene copolymers;

C) tetrafluoroethylene thermoplastic copolymers containing from 2 to 20% by moles of a perfluoroolefin $C_3$–$C_8$, such as for instance the TFE/hexafluoropropene copolymer, to which small amounts (lower than 5% by moles) of other comonomers having a perfluorovinylether structure can be added (as described for instance in the U.S. Pat. No. 4,675, 380);

D) tetrafluoroethylene thermoplastic copolymers containing from 0.5 to 13% by weight of perfluoromethylvinylether and from 0.05 to 5% by weight of one or more fluorinated monomers selected in the group formed by:

1) $R_FO-CF=CF_2$ (II)

wherein $R_F$ can be:

i) a perfluoroalkylic radical containing from 2 to 12 carbon atoms;

ii) —$(CF_2$—$CF(CF_3)$—$O)_r$—$(CF_2)_{r'}$—$CF_3$ (III)

wherein r is an integer in the range 1–4 and r' is an integer in the range 0–3;

iii) —$Z(OCF(X))_q(OCF_2$—$CF(Y))_{q'}$—$O$—$T$ (IV)

wherein the units (OCFX) and ($OCF_2$—CFY) are randomly distributed along the chain; T is a (per)fluoroalkylic radical from 1 to 3 C atoms, optionally containing one H or Cl atom; X and Y are equal to —F or —$CF_3$; Z represents —(CFX)— or —($CF_2$—CFY)—;

q and g', equal to or different from each other, are integers in the range 0–10;

the monomer average number molecular weight is in the range 200–2,000.

2) $R_F$—CH=$CH_2$ (VII)

wherein $R_F$ has the meaning described in 1);

3) a perfluorodioxole of formula:

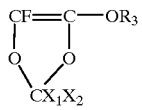

(VIII)

wherein $R_3$ is a perfluoroalkyl radical $C_1$–$C_5$, preferably —$CF_3$; $X_1$ and $X_2$ are, independently from each other, a fluorine atom or a perfluoroalkyle from one to three carbon atoms, preferably a —$CF_3$.

The preferred weight ratio of the three classes of monomers forming the tetrafluoroethylene/perfluoromethylvinylether/fluorinated monomers thermoplastic copolymers (D) is the following:

perfluoromethylvinylether: 2–99%;

fluorinated monomers: 0.1–1.5%;

tetrafluoroethylene: complement to 100%.

Among the comonomers of formula (II) for instance perfluoroethylvinylether, perfluoropropylvinylether and perfluorobutylvinylether can be mentioned. The preferred comonomer of this class is the perfluoropropylvinyether.

The comonomers of formula (III) are described, for instance, in the European Patent Application No. 75,312. Examples of these comonomers are those in which r can be 1 or 2 and r' is 2.

The comonomers of formula (IV) are obtained by dechlorination of the compounds of formula:

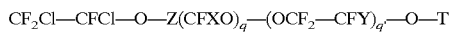

which can be prepared as described in Example 11 of the U.S. Pat. No. 4,906,770.

In the comonomers of formula (VII) $R_F$—CH=$CH_2$, the radical $R_F$ preferably contains from 2 to 6 carbon atoms. Examples of these comonomers are perfluorobutylethylene and perfluorohexylethylene.

The fluorinated comonomers from (1) to (3) above described can be copolymerized with TFE and perfluoromethylvinylether singly to give terpolymers or in combination among each other to give tetrapolymers or copolymers having a higher constituent complexity.

The tetrafluoroethylene copolymers can be prepared by radical polymerization in aqueous medium. It results particularly suitable to carry out the polymerization in aqueous phase by using a perfluoropolyether dispersion or microemulsion according to the European Patent Application No. 247,379, or, preferably, as described in the U.S. Pat. No. 4,864,006.

The preferred TFE (co)polymers to be used for the dispersion preparation of the present invention are the TFE (PTFE) homopolymers or TFE/perfluoromethylvinylether copolymers in the range 0.05–8% by moles, the latter are known as MFA perfluoropolymers.

The Melt Flow Index (MFI) is a common indicator of the average molecular weight of the polymer. The MFI (ASTM D1238-52T method) of the PTFE or of its copolymers can generally range between 0.1 and 30. However also TFE (co)polymers with molecular weight up to 1,000,000 are usable.

The fluorinated liquids of the present invention are perfluoropolyethers generally having number average molecular weight from 250 to 5,000, preferably from 350 to 1,000; or liquid perfluorocarbons and mixtures thereof, optionally containing heteroatoms such as oxygen and nitrogen, generally having a carbon atom number in the range 5–18.

By perfluoropolyether liquid it is meant compounds comprising fluorooxyalkylenic units selected from the following ones:

$(CF_2CF_2O)$, $(CF_2O)$, $(CF_2CF(CF_3)O)$, $(CF(CF_3)O)$, $(CF_2CF_2CF_2O)$, $(CF_3CF(OX_3)O)$ and $(CF(OX_3)O)$, wherein $X_3$ is —$(CF_2)_nCF_3$ and n=0,1,2,3,4, said units being randomly distributed in the polymer chain. The T end groups are of fluoroalkylic type optionally containing 1 chlorine and/or H atom, for instance: —$CF_3$, —$C_2F_5$, —$C_3F_7$, $ClCF_2CF(CF_3)$—, $CF_3CFClCF_2$—, $ClCF_2CF_2$—, $ClCF_2$—, —$CF_2H$, —$CF(CF_3)H$.

Perfluoropolyethers of neutral type, i.e. having perfluoroalkylic end groups, which are selected from the following classes can, for instance, be used:

($a_1$) $T_1$—$O(CF_2$—$CF(CF_3)O)_a(CFXO)_b$—$T_2$ wherein:

$T_1$ and $T_2$, equal to or different from each other, can be —$CF_3$, —$C_2F_5$, —$C_3F_7$ groups, X is —F or —$CF_3$; a, b are integers such that the molecular weight is in the above range.

These perfluoropolyethers are obtained according to the process described in UK 1,104,482 and with subsequent conversion of the terminal groups into unreactive groups according to UK 1,226,566.

($b_1$) $CF_3$—$O(CF_2CF_2O)_c(CF_2O)_d$—$CF_3$ wherein:

c, d are integers such that the molecular weight is in the above range.

These PFPE are prepared by $C_2F_4$ photochemical oxydation according to the U.S. Pat. No. 3,715,378.

($c_1$) $C_3F_7$—$O(CF(CF_3)$—$CF_2O)_eT_3$ wherein:

$T_3$ can be —$C_2F_5$, —$C_3F_7$; e is an integer such that the molecular weight is in the above range;

These compounds are prepared by ionic oligomerization of the hexafluoropropene epoxide and subsequent treatment of the acylfluoride (COF) with fluorine according to U.S. Pat. No. 2,242,218.

(d1) $T_4$—$O(CF_2$—$CF(CF_3)O)_g(C_2F_4O)_h(C_2F_4)(CFXO)_i$—$T_5$ wherein:

$T_4$ and $T_5$, equal to or different from each other are perfluorinated groups —$CF_3$, —$C_2F_5$, —$C_3F_7$; X is —F or —$CF_3$; g, h, i, are integers such that the molecular weight is comprised in the above range.

These products are obtained by $C_3F_6$ and $C_2F_4$ mixtures photooxidation and subsequent treatment with fluorine according to the process described in the U.S. Pat. No. 3,665,041.

(e₁) T₆—O(CF₂CF₂CF₂O)ₗ—T₇ wherein:

T₆ and T₇, equal to or different from each other, are —CF₃, —C₂F₅, —C₃F₇ groups; l is an integer such that the molecular weight is in the above range.

These products are obtained according to EP 148,482.

(f₁) T₈—O(CF₂CF₂O)ₘ—T₉ wherein:

T₈ and T₉, equal to or different from each other, are —CF₃, —C₂F₅ groups; m is an integer such that the molecular weight is in the above range.

These products are obtained according to U.S. Pat. No. 4,523,039.

The perfluoropolyethers with chlorinated end groups can be obtained for instance as described in U.S. Pat. No. 5,051,158.

The perfluoropolyethers with hydrogenated end groups are prepared according to EP 695,775.

The preferred perfluoropolyethers are those of the (a₁), (b₁) and (d₁) classes.

The volatility and viscosity characteristics of the fluorinated liquid of each specific dispersion must be selected according to the requirements needed by the application system.

The above mentioned surfactants, on the basis of their sharing between the two liquid phases (polar solvent and fluorinated liquid), can lead to an almost complete separation of the two liquid phases of the system or to partial or complete emulsion.

The present invention preferred surfactants are those which do no give complete emulsion between the polar solvent and the oil phase (fluorinated liquid) and allow the partial or complete transfer of the polymeric particulate into the fluorinated liquid phase. The fluorinated dispersions usable in this case are those obtained after removal of the supernatant layer enriched in polar solvent. These preferred surfactants are easily identifiable by the skilled in the art, since there is the partial or almost complete separation of the two liquid phases, with the lower fluorinated phase containing the (per)fluoropolymer. It is thus reduced to a minimum the content of polar solvent in the final fluorinated dispersion by separation of the supernatant layer. This represents a further advantage of the invention dispersions since it allows to minimize the content of polar solvent in the final fluorinated dispersion, increasing the polymer/polar solvent ratio with reference to that of the initial dispersion. In this way the problems associated to the presence of polar solvents, such as corrosion as to water and flammability as to alcohol are reduced.

This represents a remarkable advantage with reference to the dispersions according to the above U.S. Pat. No. 5,532,310 wherein the polar solvent content with reference to the polymer is the same as the one originally present in the starting dispersion. In this patent to reduce the drawbacks connected to the presence of the polar solvent, the compositions obtained for instance by dilution with fluorinated liquid of a 30% by weight commercial dispersion of fluoropolymer in the polar solvent up to a polymer final content of 1.5% by weight, were preferred. In this way the 95% of the composition is formed by fluorinated liquid and about 3.5% by polar solvent. The problem of the high amount of polar solvent in the dispersions is not easy to overcome directly starting from the (per)fluoropolymer dry powder, since systems with a worse dispersion degree due to the presence of coagula would be obtained, therefore with clearly lower stability and more difficult to be redispersed.

Preferably the dispersion of the present invention is obtainable by the processes described hereinafter.

It is a further object of the present invention a process to produce the fluorinated polymer dispersions in fluorinated liquids as above defined, characterized in that it comprises at least the following steps:

a') one starts from the fluorinated polymer dispersions in polar solvent (water and/or alcohol);

b') addition to the (per)fluoropolymer based on TFE in polar solvent of surfactants in an amount from 50 to 500 mg per gram of polymer, preferably from 100 to 300 mg;

c') addition to the system obtained at b') of a liquid perfluoropolyether or fluorocarbon, as above defined, such that the polymer/fluorinated liquid by weight ratio is lower than 0.7, preferably in the range 0.5–0.1.

By (per)fluoropolymer in polar solvent it is meant the (per)fluoropolymer dispersions in alcohol and the latexes obtained by the polymerization processes using water as reaction medium, preferably latexes obtained by emulsion processes, more preferably by microemulsion processes: see for instance U.S. Pat. No. 4,864,006 and U.S. Pat. No. 4,789,717.

Above latexes have generally fluorinated polymer concentration in the range 20–50% by weight.

By (per)fluoropolymer/aqueous phase are meant also the above mentioned latexes further concentrated (for instance 60–75% by weight) by means of techniques of the art, for instance by using conventional hydrogenated nonionic surfactants such as for instance Triton® X100 (octylphenoxypolyethoxyethanol).

The surfactants used at point b') can have anticorrosion properties and can be added pure or in solution and/or hydroalcoholic suspension.

Instead of the perfluoropolyether of point c'), also the corresponding structures can be used in which one or both the end groups contain an hydrogen atom. For these structures see EP 805,199 in the name of the Applicant wherein structures of various compounds with hydrogenated end groups are described.

After the addition of the fluorinated liquid at point c'), depending on the used surfactant, one can obtain either a dispersion in mixed phase polar solvent/oil; or a polymer dispersion in the fluorinated liquid with a supernatant phase enriched in polar solvent which is separated, leading therefore to an increase of the polymer/polar solvent ratio. In this latter case a surfactant is used which minimizes the emulsification of polar solvent and fluorinated liquid.

Preferably the (per) fluoropolymer/polar solvent system of point b') is obtained by a gelling, neutralization, gel dispersion process, of aqueous latexes of point a').

The process is characterized in that it comprises at least the following steps:

a") gel formation by addition of electrolytes. In the case of uni-univalent inorganic electrolytes the necessary concentration to have complete gelling is higher than $10^{-3}$ molar in the gel. Uni-univalent inorganic electrolytes, for instance nitric acid or preferably sodium-nitrate, are preferably used. With nitric acid gelling takes place preferably at a pH in the range 0.5–2.

The gel formation can be obtained by depositing the electrolyte solution on the latex surface in static conditions, or in any case under mild stirring conditions, in order to avoid coagulation phenomena.

b") preferably gel neutralization with diluted alkaline solutions (e.g NaOH $10^{-4}$ M), final pH 6–7, and optionally subsequent washing with water;

c") gel redispersion with the invention surfactants, preferably those giving partial or minimum emulsification.

The surfactants can be added to the gel both as such if liquid, and in solution and/or aqueous or hydroalcoholic dispersion, at a concentration in the range 10–90% by weight.

The necessary amount to gel redispersion is in the range 50–500 mg per gram of polymer.

The dispersion obtained from the gel forms the (per) fluoropolymer in aqueous matrix described at point b') for the formation process of the previously described dispersions.

When in the process the gelling step is used it has been found that high yields are obtained in the transfer of the TFE-based polymer from the polar solvent to the fluorinated organic one (step c'), by operating with the surfactants which allow the separation of the supernatant layer formed by a phase enriched in polar solvent.

The following examples are given for illustrative purposes of the present invention and are not limitative of the same.

EXAMPLE 1

The used latex contained a terpolymer formed by TFE-FMVE-FPVE in molar ratio 96.15–3.5–0.35 and prepared according to the process described in Example 1 of EP 633,274. The polymer particle sizes were of 75 nm of average diameter. The obtained latex had a polymer concentration of 19.3% by weight.

440 g of latex were placed in a 1 liter glass cylinder and acidified by introduction from the top of 13.6 ml of nitric acid 6.8 M, with formation of about 400 ml of a gel phase at pH=1. The polymer content in the gel phase was 196 by weight.

To 25 g of gel, corresponding to 4.75 g of polymer, 5.7 g of an aqueous solution at 25% by weight of the nonionic surfactant, were added:

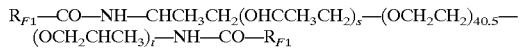

wherein:

s+t=2.5 and $R_{F1}$, with an average molecular weight of 650, is a perfluoropolyether chain having the structure:

$R_{F2}O(CF_2CF(CF_3)O)_n$, $(CF(CF_3)O)_p$, $(CF_2)_m$, $CF_2$ and $RF_2$ is perfluoroalkyl from 1 to 3 carbon atoms, by obtaining, under mild stirring, the polymer redispersion in water.

To the obtained dispersion 19 g of a mixture perfluoro 2-butyl-tetrahydrofurane/perfluoro n-octane 3:7 weight/weight (viscosity of 0.81 cSt at 25° C., b.p. of 104° C.) were added, to have a polymer/fluorinated liquid ratio of 0.25 (weight/weight). By manual mild stirring, the polymer particles transferrd from the aqueous phase to the fluorinated oil. The supernatant aqueous phase was taken after about 4 hours of decantation.

99.5% of the polymer initially present in the aqueous phase resulted transferred in the fluorinated liquid, which contained also 0.9% of surfactant referred to the weight of the final dispersion based on the fluorocarbon mixture. The surfactant present in the final fluorinated dispersion formed 15% of the amount initially added to the aqueous polymeric gel.

The final dispersion had moreover a water content, determined by Karl Fischer titration, of 2% by weight and contained 19.3% by weight of polymer and 77.8% by weight of perfluoro2-butyl-tetrahydrofurane/perfluoro n-octane mixture.

The dispersion stability in fluorianted oil was over the 16 hours, within which no variation was noticed. After 3 days of ageing the dispersion separated 30–35% of the oil but a manual mild stirring was sufficient to homogeneously redisperse the system. A partial sedimentation of the system can be desirable, since it allows further removal of the supernatant fluorinated liquid and therefore allows to obtain an even higher polymer concentration.

EXAMPLE 2

Example 1 was repeated, in the same conditions and with the same materials, but replacing the nonionic surfactnt with 5.7 g of an aqeuous solution at 25% by weight of another fluorinated nonionic surfactant:

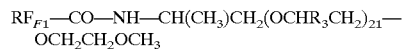

wherein:

$R_{F3}$ is the same above defined and $R_3$ is H and $CH_3$ with a $H/CH_3=18/3$ ratio.

The dispersion in fluorinated oil had the following composition (% by weight): 19.3% of polymer (corresponding to 99% of the initial polymer), 0.8% of nonionic surfactant (equal to 13% of the initial amount of surfactant), 77.9% of perfluoro-2-butyl-tetrahydrofurane/perfluoro-n-octane mixture, 2% of water.

The polymer dispersion stability in the liquid formed by the perfluoro-2-butyl-tetrahydrofurane/perfluoro-n-octane mixture was over 16 hours.

EXAMPLE 3

Example 2 was repeated in the same conditions and with the same materials, but replacing the perfluoro-2-butyltetrahydrofurane/perfluoro-n-octane mixture with an equal amount of a perfluoropolyether belonging to the class $b_1$), with a content of partially hydrogenated end groups such as to have 643 ppm of H and having: average molecular weight of 311, viscosity of 0.58 cSt at 20° C., b.p. of 80–100° C.

The final dispersion contained fluorinated liquid, surfactant and polymer in the same amounts of Example 2, with 2% of residual water. The stability resulted the same as that of the dispersion obtained in Example 2.

EXAMPLE 4

A latex similar to that of Example 1 was used, but with a content of the same polymer of 30% by weight. 220 g of latex were placed in a glass column (length 22 cm; diameter 4 cm) with a porous septum on the bottom, previously wetted with a 0.32 M $HNO_3$ solution, and then acidified by introduction from the top of 6.8 ml of nitric acid 6.8 M, with formation of about 200 ml of a gel phase at pH=1. The column bottom was then connected with a tank containing a NaOH $10^{-3}$ M solution. The NaOH solution was fluxed through the column by means of a recharging dosing pump working at 60 ml/h. The column head was connected with a tank for the recovery of the fluxed solutions from the bottom by the pump. The gel phase was neutralized with the NaOH $10^{-3}$ M solution up to a pH=7 and then washed with 250 ml of bidistilled water up to a content of $NO_3^-$ ions of 5 ppm, determined by ionic chromatography. The polymer content in the gel phase was 30% by weight.

To the gel phase 81.2 g of an aqeuous solution at 25% by weight of the fluorinated nonionic surfactant used in the dispersion preparation of Example 1 were added. In this case the amount of nonionic surfactant was equivalent to 300 mg per gram of polymer.

307.1 g of the obtained aqueous dispersion were charged with 271 g of Galden®HT70 (Ausimont) belonging to the class $a_1$), having: average moelcular weight 410, b.p. of 70° C. and viscosity of 0.5 cSt at 25° C. The polymer/oil ratio was 0.25 (weight/weight). By manual stirring the polymer particles transferred from the aqueous phase to the fluorinated oil. The aqueous phase was taken after about 4 hours of decantation.

The obtained dispersion in fluorinated oil contained 19.4% by weight of polymer (corresponding to 99.8% of the initial polymer); 0.8% of the nonionic surfactant (corresponding to 13% of the initial amount of such surfactant), residual water (Karl Fischer titration) equal to 2% by weight and 77.8% by weight of Galden® HT70.

The separated aqueous phase was dried at 80° C. by recovering about the 87% of the nonionic surfactant initially added amount.

The final dispersion in Galden® HT70, was stable for over 16 hours, without any modification of the appearance.

EXAMPLE 5

Example 4 was repeated in the same conditions and with the same materials, but using instead of the fluorinated nonionic surfactant 27.2 g of an aqueous solution at 25% by weight of the sodic salt of a carboxylic acid having a perfluoropolyether chain $R_{F3}$ with number average molecular weight 426, similar to $R_{F1}$ (ref. Example 1), but having end group $RF_4$=—$C_3ClF_6$ instead of $RF_2$.

A final dispersion in Galden®HT70 was obtained having the following composition (% by weight): 19.5% of polymer (equivalent to 99.4% of the initial polymer), 0.6% of the carboxylic acid salt with PFPE chain (equivalent to 30% of such surfactant initial amount), 1.2% of water and 78.7% of fluorinated oil. Such dispersion was stable for over 16 hours.

The separated aqueous phase, after transfer of the polymer particles in Galden® HT70, was dried at 80° C. recovering about the 70% of the initially added dispersing surfactant amount.

EXAMPLE 6

Example 5 was repeated in the same conditions and with the same materials, replacing in the gelling phase the $HNO_3$ solutions with $NaNO_3$ similar concentration solutions. The obtained gel, having pH=6.7, was formed by 30% by weight of polymer.

A final dispersion in Galden® HT70, stable for more than 16 hours, was obtained having the following composition (% by weight): 19.8% of polymer (equivalent to 99.4% of the initial polymer in the aqueous latex), 0.52% of the carboxylic acid with PFPE chain sodic salt (equivalent to 26% of such surfactant initial amount), 0.28% of water and 79.4% of Galden® HT70.

EXAMPLE 7

A PTFE latex was used, prepared according to the microemulsion polymerization process according to U.S. Pat. No. 4,864,006. The polymer content in the latex was 14.4% by weight and the particles had an average diameter of 70 nm.

216 g of latex were treated according to Example 4 until obtaining about 200 ml of gel at pH 7 with a polymer content of 17.6% by weight.

The gel phase was redispersed by adding of 37.2 g of an aqueous solution at 25% by weight of the same fluorinated nonionic surfactant used in Example 4, so as to have 300 mg of surfactant per gram of polymer.

To this aqueous system 155.5 g of Galden® HT70 were added, corresponding to a polymer/oil ratio of 0.2 (weight/weight).

By manual stirring, the polymer particles transferred from the aqueous phase to the fluorinated oil. The aqueous phase was taken after about 4 hours of decantation.

The obtained dispersion in fluorinated oil contained 16.2% by weight of polymer (equivalent to 99.8% of the initial polymer), 0.7% by weight of the fluorinated nonionic surfactant (equivalent to 14% of such surfactant initial amount), a part of residual water (Karl Fischer titration) equal to 1.8% by weight and 81.3% by weight of Galden® HT70.

The separated aqueous phase was dried at 80° C. recovering about 86%. of the initially added fluorinated nonionic surfactant.

The final dispersion in Galden® HT70 was stable for at least 16 hours.

EXAMPLE 8

A PTFE latex was used prepared by aqueous dispersion polymerization process according to U.S. Pat. No. 4,789,717 without using the perfluoropolyether. The latex was formed by particles having a similar diameter of about 0.2 micron and had a dry polymer concentration of 27.2% by weight.

300 g of latex were treated according to Example 4 until obtaining a gel phase at pH 7.5 with a polymer content of 37.5% by weight.

The gel phase was charged with 97.9 g of an aqueous solution at 25% by weight of the same fluorinated nonionic surfactant used in Example 4.

To 315.5 g of the obtained aqueous dispersion 408 g of Galden® HT70 were added, corresponding to a polymer/oil ratio of 0.2 (weight/weight).

By manual stirring, the polymer particles transferred from the aqueous phase to the fluorinated oil. The aqueous phase was taken after 16 hours of decantation.

The obtained dispersion in fluorinated oil contained 13.4% by weight of polymer (equivalent to 80% of the initial polymer), 1% by weight of the fluorinated nonionic surfactant (equivalent to 20% of such surfactant initial amount), an amount of residual water (Karl Fischer titration) equal to 2% by weight and 83.6% by weight of Galden® HT70.

The final dispersion in Galden® HT70 was stable for more than 20 hours.

EXAMPLE 9

Example 7 was repeated with the same materials and in the same conditions, but replacing the aqueous solution of fluorinated nonionic surfactant with 23.25 g of a solution at 40% by weight of the phosphoric ester:

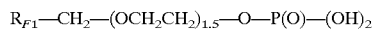

$$R_{F1}-CH_2-(OCH_2CH_2)_{1.5}-O-P(O)-(OH)_2$$

in water/isopropanol mixture 2:1 (weight/weight) wherein $R_{F1}$ is the same as previously defined.

By the addition of Galden® HT70 a separation between the fluorinated phase and the aqueous one was not obtained, but the complete emulsification of the two phases. The system did not show variations of its appearance for over 16 hours. The composition (% weight) was the following: 8.7% of polymer, 43.6% of Galden® HT70, 2.6% of phosphoric ester, 1.3% of isopropanol, 43.8% of water.

EXAMPLE 10

In a 1 liter glass separatory funnel 279 g of the same aqueous latex of Example 4 at 30% by weight of polymer and 103.2 g of an aqueous solution at 25% by weight of the same fluorinated nonionic surfactant used in Example 4 were introduced.

Under mild stirring 344 g of Galden® HT70 were added. The polymer/oil ratio was of 0.25 (weight/weight).

The water/oil/polymer dispersion was allowed to decant for 20 hours, thus separating: an heavier phase prevailingly formed by Galden® HT70 and contianing 20% of the polymer amount initially in the aqueous latex; a supernatant aqueous phase with polymer concentration of 29% by weight, very close to the initial one in the latex.

The efficiency of the polymer transfer from water to fluorinated oil results acceptable, but it is very lower than that obtained by passing through the gelling step of the same latex of Example 4.

The separated phase oil contained: 5% by weight of polymer, 0.9% by weight of the fluorinated nonionic surfactant (equivalent to 13.9% by weight of the amount of the surfactant initially added to the latex), 2% by weight of water and 92.1% by weight of Galden® HT70.

For over 25 hours no sedimentation of the polymer in the fluorinated oil was noted.

EXAMPLE 11

A latex of terpolymer TFE/FMVE/FPVE similar to that used in Example 1, but with a polymer content of 32.2% by weight, was used.

4.66 g of latex were additivated with 0.75 g of an aqueous solution at 20% by weight of the carboxylic acid with PFPE chain sodic salt of Example 5, with 94.6 g of Galden® HT70. After mild stirring, a dispersion having the following composition (% by weight) was obtained: 1.5% of polymer, 0.15% of surfactant, 3.75% of water and 94.6% of fluorinatd oil. The quick separation of the aqueous phase was noted.

The polymer sedimentation in the oil phase started after 2 hours from the preparation.

EXAMPLE 12

Comparative

Example 11 was repeated, with the same materials and in the same conditions, replacing the carboxylate having perfluoropolyether chain sodic salt solution with 0.15 g of the corresponding carboxylic acid and 0.6 g of water, according to U.S. Pat. No. 5,532,310. The % by weight composition of each component is the same of Example 11.

The aqueous phase quickly separated. The first sedimentation evidences of the polymer in the oil phase were noted within 2 minutes from the preparation.

EXAMPLE 13

Comparative

Example 33 of U.S. Pat. No. 5,532,310 was repeated, using the same materials of our Example 11 but replacing, as in Example 12, the carboxylate having perfluoropolyether chain sodic salt solution with the corresponding carboxylic acid.

4.59 g of latex, 3.27 g of carboxylic acid, 92.14 g of Galden® HT70 wer mixed under mild stirring.

The resulting dispersion had composition (% by weight): 1.48% polymer, 3.27% carboxylic acid, 3.11% water and 92.4% fluorinated oil.

The aqueous phase quickly separated. The polymer sedimentation in the oil phase started after 1 minute from the dispersion preparation.

The same Example was repeated also with a PFPE carboxylic acid having the same structure of the one used herein but with average molecular weight of 920, obtaining the same results.

EXAMPLE 14

A latex equal to that of Example 4 was used. To 90 g of the latex 10 g of an aqueous solution at 50% by weight of the nonionic surfactant Triton® X100 (octylphenoxypolyetehoxyethanol) were added under mild stirring. The so stabilized latex contained 5% by weight of Triton® X100 and 27% by weight of fluorinated polymer.

In a container containing 12 g of Galden® oil SV90 belonging to the above mentioned class $a_1$), and having average moelcular weight 460, boiling point 90° C. and viscosity 0.75 cSt at 25° C., 20 g of stabilized latex were added under mild stirring obtaining an homogeneous dispersion, of white colour, which caused a quick separation of the phases when stirring was stopped. The latex/Galden® SV90 ratio was 1.67 (weight/weight), corresponding to a polymer/oil weight ratio of 0.5.

The two phases were allowed to decant and successively the supernatant aqueous phase (about 60% of the total volume) was separated from the perfluoropolyether one. The latter appeared as an homogeneous dispersion of the polymeric particulate and did not show any modification in its physical appearance for over 10 days of observation. The perfluoropolyether phase which contained the fluoropolymer dispersed in Galden® SV90, was centrifuged for 30 minutes at 1500 rpm. In this way additional 0.5 g of aqueous supernatant layer separated without any separation of the particulate of the perfluoropolyether phase.

In consequence of the centrifugation, allowed by the high stability of the fluorinated dispersion, the oil phase PFPE had the following composition (% by weight): 5.4% of fluorinated polymer, 0.4% of non ionic surfactant Triton® X100, 84.6% of Galden® SV90, 9.6% of residual water determined according to the Karl Fischer method.

The experiment is repeated in the same conditions but employing 40 g of Galden® SV90 and 20 g of stabilized latex by Triton® X100, thus varying the latex/Galden® SV90 ratio (latex/Galden® SV90 ratio of 0.5 (weight/weight) corresponding to a polymer/oil weight ratio of 0.15).

By operating as above described, a homogeneous dispersion having the following composition (% by weight): 4% of fluorinated polymer, 0.2% of Triton® X100, 7.4% of water and 88.4% of Galden® SV90 is obtained after centrifugation.

After one month from the preparation in both the dispersions obtained after centrifugation no separation or coagulation of the dispersed solid was noted.

EXAMPLE 15

Example 14 was repeated with the difference that instead of the solution of Triton® X100 10 g of an aqueous solution at 50% by weight of a sodic salt of a carboxylic acid with PFPE chain having a structure equal to that used in Example 5, but with average molecular weight of 488 were used. The surfactant/polymer ratio, as in Example 14, was of 0.185 (weight/weight).

After decantation an amount of aqueous supernatant layer equivalent to about 60% of the initial volume of the system was separated. The lower phase, formed by a dispersion of the polymeric particulate in perfluoropolyethr, remained stable for over 10 days. This phase was centrifuged for 30 minutes at 1500 rpm, separating additional 1.7 g of aqueous supernatant layer. No sedimentation of the particulate was noted. After centrifugation, allowed by the high stability of the fluorinated dispersion, the phase composition in PFPE was the following (% by weight): 3.9% of fluorinated polymer, 0.5% of the carboxylate with PFPE chain sodic salt, 88.7% of Galden® SV90, 6.9% of water.

The Example is repeated by varying the amount of Galden® SV90 with reference to that of the stabilized latex with the sodic carboxylate having PFPE chain. In this case 40 g of perfluoropolyether are used for 20 g of stabilized latex (latex/Galden® SV90 ratio of 0.5 (weight/weight), corresponding to a polymer/oil weight ratio of 0.15). By operating as above an aqueous dispersion is obtained, after centrifugation, having the following composition (% by weight): 2.5% of fluorinated polymer, 0.3% of the carboxylate with PFPE chain sodic salt, 4.1% of water and 93.1% of Galden® SV90.

After one month from the preparation in both the dispersions obtained after centrifugation no separation or coagulation of the dispersed solid was noted.

EXAMPLE 16

In this experiment a commercial PTFE latex (Algoflon® D60PS), formed by particles of average length of 0–35 µm and average width in the range 0.08–0.14 µm was used. The dry polymer concentration is of 32% by weight. The latex was concentrated with the nonionic surfactant Triton® X100. The latex final composition (% w/w) was the following: 60% by weight of dry polymer, 2.5% of Triton® X100, 0.04% of ammonium perfluorooctanoate (PFOA—polymerization residue), 37.46% of water.

0.98 g of a carboxylic acid having PFPE chain and a structure equal to that of the fluorinated surfactant described in Example 5, but with average molecular weight of 535, were added to 97 g of a mixture formed by 92.8% by weight of Galden® SV90 and by 7.2% by weight of Fomblin® Y04 oil having a number average molecular weight of 1500 and viscosity of 38 cSt at 20° C. The oil belongs to above mentioned class $a_1$). The limpid solution which was obtained was mixed under mild stirring with 89 g of the PTFE latex concentrated at 60% by weight so as to have a polymer/oil weight ratio of 0.55. A white dispersion was so obtained showing quick phase separation at the end of the stirring.

After 8 hour of decantation, the supernatant aqueous phase was separated from the one enriched of perfluoropolyether oil mixture. The latter besides fractions of the various surfactant initial amounts contained also the 12.5% by weight of water and 25% by weight of fluorinated polymer, equivalent to about 50% of the PTFE present in the initial aqueous latex.

After more than one month from the preparation the final dispersion of fluoropolymer in the fluorinated liquid did not show of the dispersed solid separation or coagulation.

EXAMPLE 17

The previous Example 16 was repeated with the difference that the Galden® SV90 with Fomblin® Y04 mixture was replaced by another one formed by 80% by weight of Galden® SV90 and by 20% by weight of Fomblin® Y45. This oil belongs to the above metnioned class $a_1$) and has a number average molecular weight of 4100 and viscosity of 470 cSt at 20° C.

Following the procedure described in Example 16, a PTFE dispersion in fluorinated liquid containing 17.5% by weight of fluorinated polymer and fractions of the initial amounts of the various surfactants and of water was obtained.

After more than one month from the preparation the final dispersion of fluoropolymer in the fluorinated liquid did not show of the dispersed solid separation or coagulation.

EXAMPLE 18

In this experiment a PTFE concentrated latex at 60% by weight of dry polymer prepared as described in Example 16, was used. The content of Triton® X100 was of 3% by weight.

1.86 g of fluorinated nonionic surfactant having structure: $R_{F1}$—$CH_2$—$(OCH_2CH_2)5,5$—OH, wherein $R_{F1}$ has already been previously defined (Example 1), were added to 60 g of a Galden® SV90/Fomblin® Y04 mixture having a composition equal to that reported in Example 16. The obtained limpid solution was mixed under mild stirring with 50 g of the PTFE latex at 60% by weight so as to have a polymer/oil weight ratio of 0.5. A white homogeneous dispersion initially was formed which quickly gave segregation, originating:

A lower limpid phase formed by a fraction of the fluorinated liquid.

An intermediate phase formed by a milky dispersion of the PTFE particulate:

An upper aqueous phase containing part of the fluoropolymer initially present in the starting aqueous latex.

After 8 hours of decantation the upper aqueous phase was removed. The other two phases were mixed under mild stirring, obtaining a fluorinated dispersion continqing 15% by weight of PTFE, 20.2% of water and fractions of the various surfactant initial amounts.

After one month from the preparation, in this dispersion no separation or coagulation of the polymeric particulate was yet noted.

EXAMPLE 19

The dispersion obtained in Example 11, formed by the TFE/FMVE/FPVE terpolymer, carboxylic acid having PFPE chain sodic salt, water, Galden® HT70, was spray applied on aluminum specimen by using a Gema® spray gun (nozzle 1.2 mm, air pressure 3.5 atm). The dispersion was stirred and immediately applied by the spray gun. After drying for 30 minutes at room temperature, by optical microscopy it was verified that the polymer layer deposited was homogeneous and that few cracks were present, which tended to weld after sintering at 380° C. for 10 minutes.

EXAMPLE 20

Comparative

The dispersion of Example 12, formed by TFE/FMVE/FPVE terpolymer, carboxylic acid having PFPE chain, water, Galden® HT70, was stirred and applied on aluminum specimen by using the same system of the previous Example 19. After drying at room temperature, the observation by the optical microscope showed that the deposited polymer layer was completely dishomogeneous.

EXAMPLE 21

The dispersion of Example 18, formed by PTFE, Triton® X100, fluorinated nonionic surfactant, Galden®SV90/Fomblin® Y04 and water, was spray applied on aluminum specimen in the same conditions of Example 19. After drying at room temperature (30 minutes) it was noted by optical microscopy that the deposited polymer layer was homogeneous and without cracks. After sintering at 400° C. for 10 minutes, the film appeared continuous.

We claim:

1. Compositions as coatings or additives for detergent and polishing compositions having a long shelf life comprising at least 0.1–30% by weight of a polytetrafluoroethylene or tetrafluoroethylene copolymers with other ethylenically unsaturated, totally or partially fluorinated, monomers;

50–99% by weight of fluorinated liquid selected between perfluoropolyethers having fluoroalkylic end groups, optionally containing one chlorine and/or H atom, said perfluoropolyethers having number average molecular weights between 250 and 5,000, or liquid perfluorocarbons and mixtures thereof optionally containing heteroatoms such as oxygen and nitrogen, having a number of carbon atoms comprised between 5 and 18;

polar solvent complement to 100% by weight;

0.01–5% by weight of surfactant selected from:

(a) nonionic hydrogenated or (b) fluorinated, having a perfluoropolyether or perfluoroalkylic chain, both of ionic and nonionic type, selected from the following classes:
  A') mono and dicarboxylic acid salts;
  B') sulphonic acid salts;
  C') phosphoric mono- and deters and their mixtures, as such or salified, optionally containing amounts of triesters lower than 15% by moles;
  D') nonionic surfactants formed by fluorinated and polyoxyalkylenic chains with a number of oxyalkylenic repeating units higher than 6; and
  E') cationic surfactants having one or more fluorinated hydrophobic chains.

2. Composition according to claim 1 wherein in the dispersions, mixtures of the above mentioned surfactants among each other or with the following surfactants are used: carboxylic acids with PFPE or perfluoroalkylic chain having the structure of class A'), and/or nonionic surfactants with a structure similar to D') but with a number of oxyalkylenic repeating units lower than or equal to 6.

3. Composition according to claim 1, wherein the tetrafluoroethylene copolymers are selected from:

A) modified polytetrafluoroethylene containing amounts, in the range 0.01–3% by moles, preferably 0.05–0.5% by moles, of one or more comonomers selected from perfluroalkylperfluorovinylethers, preferably methylvinylether and propylvinylether; vinylidene fluoride; hexafluoroisobutene; chlorotrifluoroethylene; perfluoroalkylethylenes, preferably perfluoropropene;

B) tetrafluoroethylene (TFE) thermoplastic copolymers containing from 0.5 to 8% by moles of at least a perfluoroalkylvinylether, where the perfluoroalkylic radical has from 1 to 6 carbon atoms, preferably TFE/perfluoropropylvinyl ether, TFE/perfluoromethylvinylether, TFE/perfluoroethylvinylether, TFE/perfluoroalkylethylene copolymers;

C) tetrafluoroethylene thermoplastic copolymers containing from 2 to 20% by moles of a perfluoroolefin $C_3$–$C_8$, preferably TFE/hexafluoropropene copolymers, optionally containing amounts lower than 5% by moles of other comonomers having a perfluorovinylether structure;

D) tetrafluoroethylene thermoplastic copolymers containing from 0.5 to 13% by weight of perfluoromethylvinylether and from 0.05 to 5% by weight of one or more fluorinated monomers selected in the group formed by:

1) $R_FO-CF=CF_2$ (II)
  wherein $R_F$ can be:
  i) a perfluoroalkylic radical containing from 2 to 12 carbon atoms;
  ii) $-(CF_2-CF(CF_3)-O)_r-(CF_2)_{r'}-CF_3$ (III)
    wherein r is an integer in the range 1–4 and r' is an integer in the range 0–3;
  iii) $-Z(OCF(X))_q(OCF_2-CF(Y))_{q'}-O-T$ (IV)
    wherein the units (OCFX) and (OCF$_2$—CFY) are randomly distributed along the chain; T is a (per) fluoroalkylic radical from 1 to 3 C atoms, optionally containing one H or Cl atom; X and Y are equal to —F or —CF$_3$; Z represents —(CFX)— or —(CF$_2$—CFY)—;
  q and q', equal to or different from each other, are integers in the range 0–10;
  the average number molecular weight of the monomer is in the range 200–2,000.

2) $R_F-CH=CH$, (VII)
  wherein $R_F$ has the meaning described in 1);

3) a perfluorodioxole of formula:

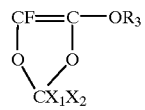

(VIII)

wherein $R_3$ is a perfluoroalkyl radical $C_1$–$C_5$, preferably —CF$_3$; $X_1$ and $X_2$ are, independently from each other, a fluorine atom or a perfluoroalkyle from one to three carbon atoms, preferably a —CF$_3$.

4. Composition according to claim 3 wherein the tetrafluoroethylene copolymers are prepared by radical polymerization in aqueous medium, preferably by aqueous phase polymerization by using a perfluoropolyether dispersion or microemulsion.

5. Composition according to claim 3 wherein the TFE (co)polymers are the TFE (PTFE) homopolymers or TFE copolymers with perfluoromethylvinylether in the range 0.05–8% by moles.

6. Composition according to claim 1 wherein the perfluoropolyether liquid comprises fluorooxyalkylenic units selected from: (CF$_2$CF$_2$O), (CF$_2$O), (CF$_2$CF(CF$_3$)O), (CF(CF$_3$)O), (CF$_2$CF$_2$CF$_2$O) (CF$_2$CF(OX$_3$)O) e (CF(OX$_3$)O), wherein X$_3$ is —(CF$_2$)$_n$CF$_3$ and n=0,1,2,3,4, said units being randomly distributed along the polymer chain; the T end groups are of fluoroalkylic type optionally containing 1 chlorine and/or H atom, for instance: —CF$_3$, —C$_2$F$_5$, —C$_3$F$_7$, ClCF$_2$CF(CF$_3$)—, CF$_3$CFClCF$_2$—, ClCF$_2$CF$_2$—, ClCF$_2$—, —CF$_2$H, —CF(CF$_3$)H.

7. Composition according to claim 1 wherein the above defined surfactants do not give complete emulsion between the polar solvent and the oil phase (fluorinated liquid) and allow the partial or complete transfer of the polymeric particulate in the fluorinated liquid phase; the fluorinated dispersions are preferably obtained after removal of the supernatant layer enriched of polar solvent so increasing the polymer/polar solvent ratio in the final fluorinated dispersion with reference to that of the initial dispersion.

8. Dispersions according to claim 1.

9. Process for preparing the dispersions of claim 1 comprising at least the following steps:

a') starting from the fluorinated polymer dispersions in polar solvent (water and/or alcohol);

b') addition to the (per)fluoropolymer based on TFE in polar solvent of surfactants in an amount from 50 to 500 mg per gram of polymer, preferably from 100 to 300 mg;

c') addition to the system obtained at point b') of a perfluoropolyether or fluorocarbon liquid, as above defined, such that the polymer/fluorinated liquid by weight ratio is lower than 0.7 preferably in the range 0.5–0.1.

10. Process according to claim 9 wherein the (per)fluoropolymer in polar solvent is a disperion of (per)fluoropolymer in alcohol or a latex obtained from polymerization processes which use water as reaction medium, preferably latexes obtained from emulsion processes, more preferably from microemulsion processes.

11. Process according to claim 10 wherein the latexes are further concentrated at 60–75% by weight by means of known techniques by using conventional hydrogenated nonionic surfactants.

12. Process according to claim 9 wherein instead of the perfluoropolyether of point c') the corresponding structures wherein one or both the end groups contain an hydrogen atom are used.

13. Process according to claim 9 wherein the (per)fluoropolymer/polar solvent system of point b') is obtained by means of a gelling process, optionally neutralization, gel dispersion, of aqueous latexes of point a').

14. Process according to claim 13 comprising at least the following steps:

a") gel formation by addition of electrolytes;

b") preferably gel neutralization and optionally subsequent washing with water;

c") gel redispersion with the above defined surfactants, preferably those giving partial or minimum emulsification.

* * * * *